United States Patent [19]

Seike et al.

[11] Patent Number: 4,782,199

[45] Date of Patent: Nov. 1, 1988

[54] INSULATORS HAVING IMPROVED STEEP WAVE FRONT CHARACTERISTICS

[75] Inventors: Shoji Seike; Takao Totoki; Toshiyuki Mima, all of Nagoya, Japan

[73] Assignee: NGK Insulators, Ltd., Nagoya, Japan

[21] Appl. No.: 112,274

[22] Filed: Oct. 26, 1987

[30] Foreign Application Priority Data

Feb. 25, 1987 [JP] Japan .................................. 62-40457

[51] Int. Cl.$^4$ ........................ H01B 17/50; C03C 8/02
[52] U.S. Cl. .................................... 174/189; 174/182; 174/209; 501/21; 501/70
[58] Field of Search ............... 174/137 A, 137 B, 182, 174/188, 189, 209, 210

[56] References Cited

U.S. PATENT DOCUMENTS

| | | | |
|---|---|---|---|
| 2,157,100 | 5/1939 | Rowland | 174/209 |
| 2,250,044 | 7/1941 | Croskey et al. | 174/209 |
| 2,287,976 | 6/1942 | Croskey et al. | 174/209 |
| 2,389,386 | 11/1945 | Russell, Jr. | 174/209 X |
| 3,024,303 | 3/1962 | Smothers et al. | 174/189 |
| 3,097,101 | 7/1963 | Lester | 174/137 B X |

FOREIGN PATENT DOCUMENTS

| | | | |
|---|---|---|---|
| 49-21865 | 6/1974 | Japan | 174/209 |
| 51-4275 | 2/1976 | Japan | 174/209 |
| 1008178 | 3/1983 | U.S.S.R. | |

OTHER PUBLICATIONS

EPRI, Nov., 1977, "Improvement of Mechanical and Electrical Strength of Porcelain Insulators".

Primary Examiner—Laramie E. Askin
Attorney, Agent, or Firm—Parkhurst, Oliff & Berridge

[57] ABSTRACT

A high voltage porcelain insulator having a glaze applied to at least a head portion of the insulator which head portion is covered by a metal fitting and a cement. The glaze essentially consists of, in terms of weight, from 64.0 to 68.0% of $SiO_2$, from 17.5 to 19.0% of $Al_2O_3$, from 5.0 to 6.5% of MgO, not more than 3.0% of CaO, from 2.0 to 2.8% of $K_2O$ and $Na_2O$ in a total amount, and from 3.0 to 9.0%, when calculated as MnO, a compound which is converted to MnO and or $MnO_2$ after being fired at a temperature range suitable for firing porcelain.

8 Claims, 2 Drawing Sheets

FIG._2
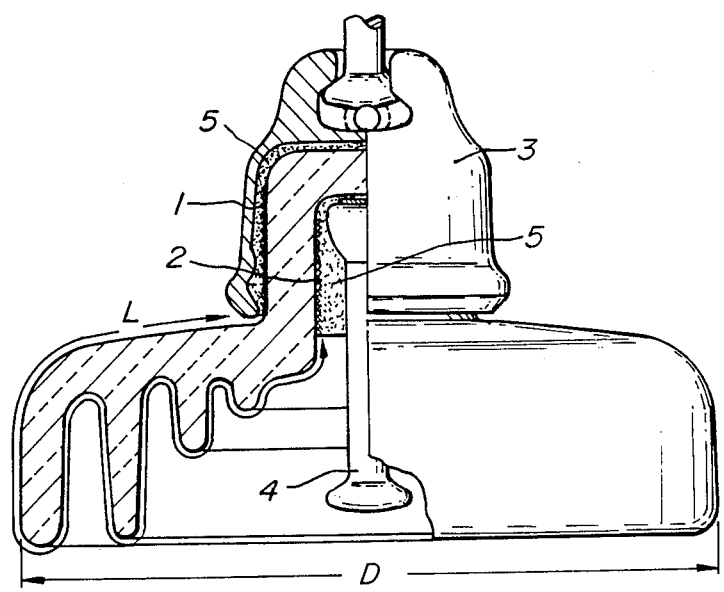
FIG._3
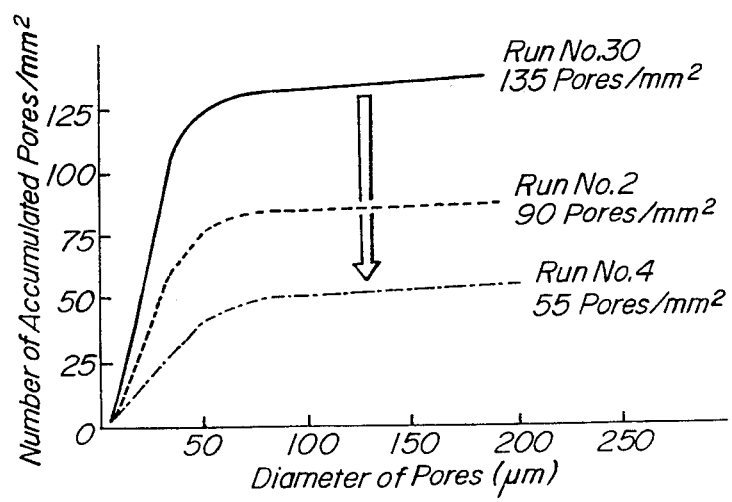

INSULATORS HAVING IMPROVED STEEP WAVE FRONT CHARACTERISTICS

BACKGROUND OF THE INVENTION (1) Field of the Invention

The present invention relates to high voltage porcelain insulators having an excellent steep wave front characteristic.

(2) Related Art Statement

With recent increases in capacity and voltage of power transmission lines, it is expected that the mechanical strength and electrical performances of suspension insulators, improved and and the like, would be that reliability of the suspension insulators, and the like, would be enhanced. In order to raise the voltage in the power transmission lines, it is necessary to enlarge a head portion of the insulators and to prolong a leakage distance of a shed portion thereof, which, however, poses the following problems.

First, enlargement of the head portion of the insulator leads to enlargement and weight increase of metal fittings used and accordingly weight increase in the insulator. Consequently, steel towers become larger and construction cost of power transmission lines increases. Alternatively, it is possible to increase the strength of porcelain by adding a great amount of alumina crystals to the porcelain so that a required mechanical strength may be attained while the shape of the head portion is maintained in a small size. However, since the dielectric strength of the porcelain itself lowers due to increasing of the alumina crystals, electrical performances, such as a steep wave front characteristic, of the insulator accordingly decrease.

When the leakage distance becomes longer, some electrical performances, such as contaminating resistance, are improved. However, since the flashover voltage on the surface of the shed portion becomes higher at lightning, penetration shorting is likely to occur at a porcelain head portion of the insulator. As a result, there is a shortcoming that a steep wave front characteristic is decreased as compared with the case where insulators have heads of the same shape with a shorter leakage distance.

Under the circumstances, there have been desired developments of the insulators which have an excellent steep wave front characteristic even under high voltages while the strength of the insulators themselves are maintained by the same shape as in the conventional insulators.

In general, an insulating portion of an insulator is constituted by a porcelain, a glaze and a sanded portion. Although various improvements on each of these portions have been made, they are all related to improvements in mechanical strength. However, no information has been available concerning the improvements on steep wave front characteristics. Thus, it has been impossible to accomplish the object of the present invention to develop insulators having excellent steep wave front characteristic from the above-mentioned prior art.

Further, in order to improve the dielectric strength, that is, the steep wave front characteristic of the porcelain, it has been contrived to homogenize and make finer the microstructure of the porcelain finer or reduce the dielectric loss of the porcelain. In the former case, the shaping workability is deteriorated and cost largely increases, while in the latter case, there is a limit for the use of the alumina crystals. Further, these countermeasures are essentially contrary to the objects to maintain the production cost or the mechanical strength. Thus, the insulators which met all the requirements for the steep wave front characteristic and mechanical strength could not be obtained only by improving the porcelain itself.

With respect to the glazes used in porcelain insulators, for instance,, Japanese patent publication Nos. 49-21,865 and 51-4,275 disclose insulators in which the coefficient of thermal expansion of the glaze is specified. However, they are all to improve the mechanical strength of the insulators.

Furthermore, with respect to the sanded portions, in EPRI literature "Improvement of Mechanical and Electrical Strength of Porcelain Insulators", it is described that the mechanical strength of the insulators is improved by specifying the coefficient of thermal expansion of the sand. However, this reference is also merely to improve the mechanical strength of the insulators as in the former cases.

SUMMARY OF THE INVENTION

It is an object of the present invention to obviate the above-mentioned drawbacks, and to provide high voltage porcelain insulators which have excellent reliability attained by improving the steep wave front characteristic as an index of an internal insulation of the insulators at the time of lightning without losing mechanical strength and electrical performances of general insulators, and which can be miniaturized even at the same proof strength.

The high voltage porcelain insulators according to the present invention have a glaze applied to at least a head portion of the porcelain insulator which head portion is covered with a metal fitting and cement, said glaze comprising, as expressed by weight, from 64.0 to 68.0% of $SiO_2$, from 17.5 to 19.0% of $Al_2O_3$, from 5.0 to 6.5% of $MgO$, not more than 39% of $CaO$, from 2.0 to 2.89% of $K_2O+Na_2O$ in a total amount, and from 3.0 to 9.0%, when calculated as $MnO$, of a compound which is converted into $MnO$ or $MnO_2$ after being fired at a temperature range suitable for firing the porcelain.

These and other objects, features, and advantages of the present invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIG. 2 is a partial sectional view of an insulator as used in tests; and

FIG. 3 is a graph showing the relation between the number of pores and the diameter of accumulated pores in the present invention and comparative examples.

DETAILED DESCRIPTION OF THE INVENTION

Figure 1:
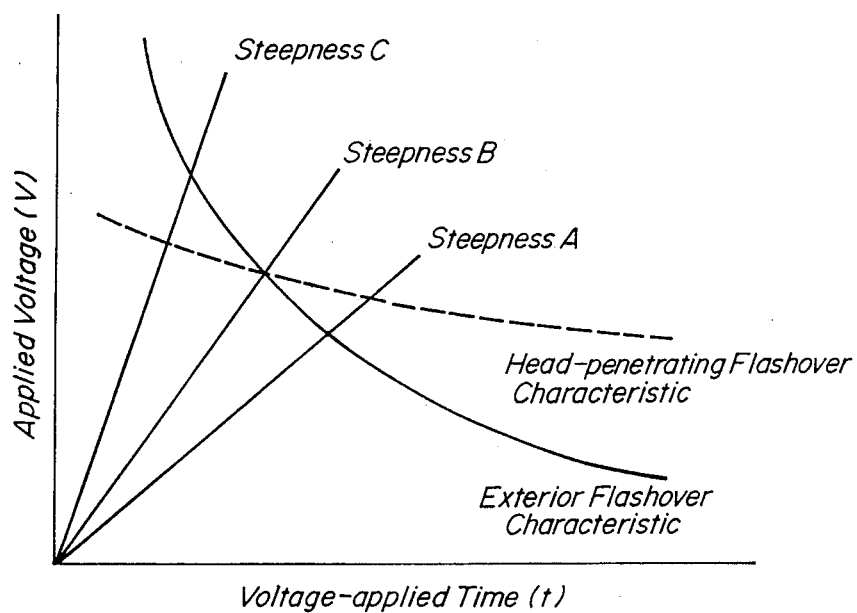
FIG. 1 is a graph showing the relation among the steepness, the head-penetrating flashover characteristic and an external flashover characteristic.

In the above-mentioned construction of the present invention, the microstructure of a glaze applied onto the surface of at least the porcelain head portion of the insulator can be improved by incorporating, into basic chemical components of $SiO_2$, $Al_2O_3$, MgO, CaO and $K_2O + Na_2O$, 3.0 to 9.0% by weight, when calculated as MnO, of a compound which is converted to MnO or $MnO_2$ in a state of an oxide when being fired at a temperature range suitable for firing porcelain.

By so doing, while various characteristics necessary for the insulators are not lost, since the steep wave front characteristic of the insulators is not deteriorated even when the dielectric strength of the porcelain is lowered by adding a greater amount of alumina crystals as compared with conventional techniques, the present invention can afford the high voltage porcelain insulators of which head portions may be miniaturized.

In the present invention, respectively numerical limitations of $SiO_2$, $Al_2O_3$, MgO, CaO and $K_2O + Na_2O$ are basic to known glazes for high strength porcelain insulators, and known numerical ranges are employed for these components. The reason why the compound which is the greatest feature of the present invention and is converted into MnO or $MnO_2$ after being fired at a temperature range suitable for firing porcelain is contained in an amount of 3.0 to 9.09% by weight when calculated as MnO is that if it is less than 39% by weight, the conspicuously improved steep wave front characteristic cannot be obtained, while if it is more than 9.0% by weight, the mechanical strength is lowered. The addition of manganese oxide functions to reduce pores in the glaze.

The reason why the number of pores having a diameter of not less than 5 $\mu$m in the glaze is preferably not more than 100/mm$^2$ is that the microstructure in which the pores to deteriorate the steep wave front characteristic are reduced can be obtained.

The reasn why the coefficient of thermal expansion of the glaze is preferably maintained lower than that of the porcelain is that as formerly known, compression force can be obtained due to the compression glaze to increase the mechanical strength of the insulators. The difference in the coefficient of thermal expansion is not less than $1.0 \times 10^{-6}/°C.$ because such an enhancing effect is conspicuous.

In the following, the steep wave front characteristic and steepness as a steep wave front characteristic-evaluating scale will be explained.

The steep wave front characteristic is an index for representing the insulating performance of the insulator head portion in the case where the insulator in a power transmission line is struck by lightning. As phenomena ordinarily occurring when the insulator is struck by lightning, there are an external flashover passing along the surface of a shed portion of the insulator and a head-penetrating flashover passing through the head portion of the insulator. It is preferable that when steep waves are applied to the insulator, the external flashover occurs. There is a fear that the insulator may break due to the head-penetrating flashover. Thus, such must not occur since serious damages such as line breakage in the power transmission lines takes place.

Next, the steepness which is the evaluating scale of the steep wave front characteristic is to represent a magnitude of an experimental scale lightning produced corresponding to a natural lightning. More specifically, the steepness is determined by a voltage V (kv) applied to the insulator and a point of time t ($\mu$s) when the voltage reaches a maximum value after initial application of the voltage. That is, Steepness = V/t (kv/$\mu$s)

The higher the steepness, that is, the higher the maximum voltage, or the shorter a leading time period, the more severe the experimental conditions.

FIG. 1 shows the relation among the steepness, the head-penetrating flashover characteristic and the external flashover characteristic by using a voltage-applying time period and an applied voltage as parameters. This relation is influenced by the shape of the insulator. The magnitudes of the steepness of A, B and C in FIG. 1 are in the order of A < B < C. As the steepness becomes larger, the head-penetrating flashover voltage becomes lower than the external flashover voltage so that the head portion is likely to be broken due to the head-penetrating flashover. Therefore, as the steepness for the head-penetrating breakage becomes larger, the insulator has a more excellent steep wave front characteristic.

In the following, examples of the present invention will be explained in more detail. These examples are merely illustrative of the invention, and should never be interpreted to limit the scope of the invention.

By using a body having the same cmmposition, a fog-type insulator having a surface leakage distance L = 540 mm, a shed portion diameter D = 320 mm$\phi$, and a head side portion thickness T = 21 mm$\phi$, and a small head type insulator having L = 310 mm, D = 258 mm$\phi$, and T = 12 mm were prepared. Next, a glaze of Table 1 falling inside or outside the compounding scope of the present invention was applied to each of the outer and inner sides of the head portion of each of the insulator bodies to form glaze layers 1 and 2, which was fired. A head cap 3 and a pin 4 both made of a metal were fitted to the insulator body via a cement 5, thereby obtaining insulators for evaluating their characteristics.

With respect to the thus obtained insulators having different shapes, the steep wave front characteristic was evaluated. By using tens of thus obtained insulators as one lot, a positive voltage was applied to a pin side at ten times under a constant steepness while the head cap 3 and the pin 4 of each of the insulators were employed as electrodes. With respect to the insulators in which the head portion was not broken under that steepness, the polarity was changed, that is, a negative voltage was applied to the pin side of each of the insulators at 10 times. Further, similar tests were carried out for other lots while the steepness was varied. Results were shown in Table 1 in which " ◯ " denotes no head-penetrating breakage, "Δ" denotes a case where only one of ten insulators was broken due to head-penetrating flashover, and "x" denotes a case where two or more of the ten insulators were broken due to the head-penetrating flashover.

Pores contained in the glaze layers 1 and 2 were observed by means of an image analyzer with respect to a sample which was obtained by cutting a portion of the glaze at the head portion of the insulator having actually undergone the steep wave front characteristic test and polishing it in a direction orthogonal to the surface of the glaze layers 1 and 2. The number of pores was counted until it reached about 1,000 with respect to each of the samples for enabling sufficient measurement of the static distribution. Results are also shown in Table 1. Further, the coefficient of thermal expansion of each of the glazes was measured and shown in Table 1.

With respect to the strength of the thus obtained insulators, by taking the strength of an insulator having the same shape with a conventional glaze applied to a head portion as 100, an insulator having 95% or more of this strength is denoted by " ○ ", that of from 80 to less than 95% is denoted by "Δ", and that of less than 80% is denoted by "x". In the final total evaluation of Table 1, " ⊙ ", " ○ ", "Δ, and "X" denote the most preferable, preferable, equivalent to the conventional insulator, and rejected, respectively, taking the steep wave front characteristic and the strength of the insulator into consideration.

and the coefficient of the thermal expansion are preferred.

From FIG. 3 showing the relation between the diameter of the pores and the number of accumulated pores in Test Run Nos. 30, 2, and 4, it is understood that the smaller the number of pores having a diameter of not less than 5 μm per mm2, the smaller the number of accumulated pores giving rise to inverse effect of the steep wave front characteristic etc. Further, it is also seen that the small head type insulator to which the glaze according to the present invention was applied exhibited equivalent or more excellent performance as compared with the conventional ones.

The present invention will not be limited to the above-mentioned examples only, but various modifica-

TABLE 1

| | Chemical composition after firing (wt %) | | | | | | Glaze characteristics | | | Product characteristics | | | | | |
|---|---|---|---|---|---|---|---|---|---|---|---|---|---|---|---|
| | | | | | | | | | Difference in coefficient of thermal expansion between glaze and porcelain ($\times 10^{-6}/°C$.) | Steep wave front characteristics (kv/μs) | | | | | |
| | | | | | | | | | | 210 KN fog-type insulator | | 125 KN small head type insulator | | | Total evaluation |
| Run No. | SiO$_2$ | Al$_2$O$_3$ | CaO | MgO | K$_2$O + Na$_2$O | MnO | Number of pores in glaze (/mm$^2$) | Coefficient of thermal expansion ($\times 10^{-6}/°C$.) | | Steepness 6000 | Steepness 2500 | Steepness 4000 | Steepness 2500 | Product strength | |
| Present invention | | | | | | | | | | | | | | | |
| 1 | 67.5 | 18.3 | 0.7 | 6.5 | 2.9 | 3.9 | 100 | 3.0 | 2.7 | Δ | ○ | Δ | ○ | ○ | ○ |
| 2 | 67.2 | 18.3 | 0.7 | 6.4 | 2.8 | 4.6 | 90 | 3.1 | 2.6 | ○ | ○ | ○ | ○ | ○ | ⊙ |
| 3 | 66.9 | 17.9 | 0.7 | 6.3 | 2.8 | 5.4 | 60 | 3.2 | 2.5 | ○ | ○ | ○ | ○ | ○ | ⊙ |
| 4 | 64.7 | 18.2 | 0.6 | 6.3 | 2.8 | 7.4 | 55 | 3.6 | 2.1 | ○ | ○ | ○ | ○ | ○ | ⊙ |
| 5 | 67.7 | 18.3 | 1.2 | 6.0 | 2.7 | 3.8 | 85 | 3.2 | 2.5 | ○ | ○ | Δ | ○ | ○ | ○ |
| 6 | 66.0 | 18.0 | 1.3 | 5.9 | 2.7 | 6.1 | 60 | 3.7 | 2.0 | ○ | ○ | ○ | ○ | ○ | ⊙ |
| 7 | 67.7 | 18.5 | 1.9 | 5.9 | 2.6 | 3.4 | 90 | 3.2 | 2.5 | Δ | ○ | X | ○ | ○ | ○ |
| 8 | 66.4 | 18.6 | 1.8 | 5.9 | 2.5 | 4.8 | 70 | 3.5 | 2.2 | ○ | ○ | ○ | ○ | ○ | ⊙ |
| 9 | 64.5 | 18.1 | 1.7 | 5.7 | 2.6 | 7.4 | 60 | 3.8 | 1.9 | ○ | ○ | ○ | ○ | ○ | ⊙ |
| 10 | 66.5 | 18.6 | 2.3 | 5.5 | 2.4 | 4.7 | 60 | 3.5 | 2.2 | ○ | ○ | ○ | ○ | ○ | ⊙ |
| 11 | 67.1 | 18.5 | 2.9 | 5.3 | 2.5 | 3.7 | 85 | 3.4 | 2.3 | ○ | ○ | Δ | ○ | ○ | ○ |
| 12 | 65.3 | 18.1 | 2.7 | 5.1 | 2.3 | 6.5 | 55 | 4.2 | 1.5 | ○ | ○ | ○ | ○ | ○ | ⊙ |
| Comparative Example | | | | | | | | | | | | | | | |
| 13 | 70.0 | 18.5 | 3.9 | 4.4 | 3.2 | 0.0 | 100 | 3.5 | 2.2 | Δ | ○ | X | Δ | ○ | Δ |
| 14 | 69.6 | 19.4 | 1.2 | 5.9 | 3.9 | 0.0 | 170 | 3.2 | 2.5 | X | X | X | X | ○ | X |
| 15 | 69.3 | 19.2 | 1.3 | 5.1 | 5.1 | 0.0 | 170 | 3.8 | 1.9 | X | X | X | X | ○ | X |
| 16 | 68.5 | 19.3 | 0.7 | 4.7 | 6.6 | 0.0 | 120 | 4.8 | 0.9 | X | X | X | X | Δ | X |
| 17 | 68.0 | 18.7 | 0.5 | 4.1 | 8.7 | 0.0 | 130 | 5.4 | 0.3 | X | X | X | X | X | X |
| 18 | 69.4 | 19.3 | 4.6 | 4.5 | 2.2 | 0.0 | 100 | 3.1 | 2.6 | Δ | ○ | X | Δ | ○ | Δ |
| 19 | 63.6 | 17.8 | 0.6 | 6.2 | 2.7 | 9.1 | 50 | 4.8 | 0.9 | ○ | ○ | ○ | ○ | Δ | Δ |
| 20 | 70.5 | 19.1 | 1.3 | 6.3 | 2.8 | 0.0 | 130 | 2.9 | 2.8 | X | Δ | X | Δ | ○ | X |
| 21 | 68.3 | 18.6 | 1.3 | 6.2 | 2.8 | 2.8 | 105 | 3.0 | 2.7 | Δ | ○ | X | Δ | ○ | Δ |
| 22 | 69.8 | 19.5 | 1.9 | 6.1 | 2.7 | 0.0 | 160 | 2.9 | 2.8 | X | X | X | X | ○ | X |
| 23 | 68.5 | 18.9 | 1.9 | 6.0 | 2.6 | 2.1 | 115 | 3.1 | 2.6 | X | Δ | X | X | ○ | X |
| 24 | 69.8 | 19.5 | 2.4 | 5.8 | 2.5 | 0.0 | 140 | 3.1 | 2.6 | X | Δ | X | X | ○ | X |
| 25 | 68.0 | 18.7 | 2.4 | 5.6 | 2.5 | 2.8 | 105 | 3.2 | 2.5 | ○ | ○ | X | Δ | ○ | Δ |
| 26 | 69.8 | 19.4 | 2.9 | 5.4 | 2.5 | 0.0 | 150 | 3.1 | 2.6 | X | Δ | X | X | ○ | X |
| 27 | 68.0 | 19.0 | 2.9 | 5.2 | 2.6 | 2.3 | 110 | 3.3 | 2.4 | Δ | ○ | X | Δ | ○ | Δ |
| Prior art | | | | | | | | | | | | | | | |
| 28 | 68.7 | 20.0 | 0.6 | 6.6 | 4.1 | 0.0 | 180 | 2.9 | 2.8 | X | X | X | X | ○ | X |
| 29 | 70.0 | 19.6 | 0.6 | 6.8 | 3.0 | 0.0 | 140 | 2.8 | 2.9 | X | X | X | X | ○ | X |
| 30 | 68.2 | 19.1 | 0.6 | 6.6 | 2.9 | 2.6 | 135 | 2.8 | 2.9 | X | Δ | X | X | ○ | X |

It is seen from results in Table 1 that both the steep wave front characteristic and the strength aimed at by the present invention can be attained in the case of Test Run Nos. 1 to 12 which have the MnO-calculated amount after the firing inside the range of the present invention in the chemical composition of the glaze applied to the head portion and in which the total evaluation is or " ○ " or " ⊙ ".

The number of the pores in the glaze used in the insulators falling inside the scope of the present invention is not more than 100/mm$^2$, and the coefficient of thermal expansion of the glaze is smaller than that of the porcelain, that is, smaller by $1.0 \times 10^{-6}/°C$. or more. It is seen that the above ranges of the number of the pores tions and changes could be made. For instance, in the above-mentioned examples, the glaze having the specified composition was applied to the head portion only. However, the present invention will not be limited to this style, and the effects aimed at by the present invention could be obtained by applying the glaze to at least the head portion.

As evident from the aforegoing, according to the high voltage porcelain insulators of the present invention, contradictory performances of the steep wave front characteristic and the high strength which give excellent performances as the insulators can both be attained by applying the glaze having the specified chemical composition to at least the head portion of the porcelain. Therefore, the head portions of the high voltage porcelain insulators can be minimized, thereby enabling small size and light weight of the insulators.

We claim:

1. A high voltage porcelain insulator having a glaze applied to at least a head portion of the porcelain insulator which head portion is covered with a metal fitting and cement, said glaze comprising, in terms of weight, from 64.0 to 68.0% of $SiO_2$, from 17.5 to 19.0% of $Al_2O_3$, from 5.0 to 6.5% of MgO, not more than 3.0% of CaO, from 2.0 to 2.8% of $K_2O+Na_2O$ in a total amount, and from 3.0 to 9.0%, when calculated as MnO, of a compound which is converted to MnO or $MnO_2$ after being fired at a temperature range suitable for firing porcelain.

2. A high voltage porcelain insulator according to claim 1, wherein the number of pores having a diameter of not less than 5 $\mu$m as viewed at a sectional portion of a layer of the glaze applied to the head portion is not more than 100/mm$^2$.

3. A high voltage porcelain insulator according to claim 1, wherein the coefficient of thermal expansion of the glaze is smaller than that of the porcelain.

4. A high voltage porcelain insulator according to claim 1, wherein a difference in coefficient of thermal expansion between the glaze and the porcelain is not less than $1.0 \times 10^{-6}/°C$.

5. A high voltage porcelain insulator having a glaze applied only to a head portion of the porcelain insulator which head portion is covered with a metal fitting and cement, said glaze comprising, in terms of weight, from 64.0 to 68.0% of $SiO_2$, from 17.5 to 19.0% of $Al_2O_3$, from 5.0 to 6.5% of MgO, not more than 3.0% of CaO, from 2.0 to 2.8% of $K_2O+Na_2O$ in a total amount, and from 3.0 to 9.0%, when calculated as MnO, of a compound which is converted to MnO or $MnO_2$ after being fired at a temperature range suitable for firing porcelain.

6. A high voltage porcelain insulator according to claim 5, wherein the number of pores having a diameter of not less than 5 $\mu$m as viewed at a sectional portion of a layer of the glaze applied to the head portion is not more than 100/mm$^2$.

7. A high voltage porcelain insulator according to claim 5, wherein the coefficient of thermal expansion of the glaze is smaller than that of the porcelain.

8. A high voltage porcelain insulator according to claim 5, wherein a difference in coefficient of thermal expansion between the glaze and the porcelain is not less than $1.0 \times 10^{-6}/°C$.

* * * * *